(12) United States Patent
Golab et al.

(10) Patent No.: US 8,645,309 B2
(45) Date of Patent: Feb. 4, 2014

(54) PROCESSING DATA USING SEQUENTIAL DEPENDENCIES

(75) Inventors: Lukasz Golab, Morris Plains, NJ (US);
Howard Karloff, New York, NY (US);
Philip Korn, New York, NY (US);
Divesh Srivastava, Summit, NJ (US);
Avishek Saha, West Bengal (IN)

(73) Assignee: AT&T Intellectual Property I. L.P., Atlanta, GA (US)

( * ) Notice: Subject to any disclaimer, the term of this patent is extended or adjusted under 35 U.S.C. 154(b) by 621 days.

(21) Appl. No.: 12/592,586

(22) Filed: Nov. 30, 2009

(65) Prior Publication Data
US 2011/0131170 A1 Jun. 2, 2011

(51) Int. Cl.
| | |
|---|---|
| G06F 17/00 | (2006.01) |
| G06N 7/04 | (2006.01) |
| G06N 5/02 | (2006.01) |
| G06N 7/00 | (2006.01) |
| G06N 7/08 | (2006.01) |
| G06F 11/00 | (2006.01) |
| G06F 11/30 | (2006.01) |
| G06C 25/00 | (2006.01) |
| H03M 13/00 | (2006.01) |
| H04L 1/00 | (2006.01) |

(52) U.S. Cl.
USPC .................. 706/54; 706/47; 706/48; 706/59; 714/746

(58) Field of Classification Search
USPC ...................... 706/54; 714/724, 746; 717/124
See application file for complete search history.

(56) References Cited

U.S. PATENT DOCUMENTS

| | | | | |
|---|---|---|---|---|
| 6,671,715 | B1 * | 12/2003 | Langseth et al. | 709/203 |
| 8,280,857 | B2 * | 10/2012 | Zaifman | 707/692 |
| 2008/0162515 | A1 * | 7/2008 | Dovas et al. | 707/100 |

OTHER PUBLICATIONS

Cong, Gao; Fan, Wenfei; Geerts, Floris; Jia, Xibei; Ma, Shuai. "Improving Data Quality: Consistency and Accuracy." VLDB '07 Proceedings of the 33rd international conference on Very large data bases p. 315-326 (2007).*
L. Golab, H. Karloff, F. Korn, D. Srivastava, and B. Yu. On generating near-optimal tableaux for conditional functional dependencies. PVLDB, 1(1):376-390, 2008.*
P. Bohannon, W. Fan, M. Flaster, and R. Rastogi. A cost-based model and effective heuristic for repairing constraints by value modification. In SIGMOD, 2005.*

(Continued)

*Primary Examiner* — Kakali Chaki
*Assistant Examiner* — Daniel Pellett
(74) *Attorney, Agent, or Firm* — Hanley, Flight & Zimmerman, LLC

(57) ABSTRACT

The specification describes data processes for analyzing large data steams for target anomalies. "Sequential dependencies" (SDs) are chosen for ordered data and present a framework for discovering which subsets of the data obey a given sequential dependency. Given an interval G, an SD on attributes X and Y, written as X→G Y, denotes that the distance between the Y-values of any two consecutive records, when sorted on X, are within G. SDs may be extended to Conditional Sequential Dependencies (CSDs), consisting of an underlying SD plus a representation of the subsets of the data that satisfy the SD. The conditional approximate sequential dependencies may be expressed as pattern tableaux, i.e., compact representations of the subsets of the data that satisfy the underlying dependency.

17 Claims, 15 Drawing Sheets

(56) References Cited

OTHER PUBLICATIONS

Wijsen, Jef. "Temporal dependencies with order constraints." A TimeCenter Technical Report. (1999).*

Huhtala, Ykä, et al. "TANE: An efficient algorithm for discovering functional and approximate dependencies." The Computer Journal 42.2 (1999): 100-111.*

Korn, Flip, S. Muthukrishnan, and Yunyue Zhu. "Checks and balances: Monitoring data quality problems in network traffic databases." Proceedings of the 29th international conference on Very large data bases—vol. 29. VLDB Endowment, 2003.*

Guo, Sha, Wei Sun, and Mark A. Weiss. "Solving satisfiability and implication problems in database systems." ACM Transactions on Database Systems (TODS) 21.2 (1996): 270-293.*

* cited by examiner

US 8,645,309 B2

PROCESSING DATA USING SEQUENTIAL DEPENDENCIES

FIELD OF THE INVENTION

This invention relates to processing large volumes of data to reveal data reliability in conforming to selected categories of ordered attributes. It invokes sequential dependencies to express the ordered attributes.

BACKGROUND OF THE INVENTION

Interesting data sets often contain attributes with ordered domains: timestamps, sequence numbers, surrogate keys, measured values such as sales, temperature and stock prices, etc. Understanding the semantics of such data is an important practical problem, both for data quality assessment as well as knowledge discovery. However, integrity constraints such as functional and inclusion dependencies do not express any ordering properties.

STATEMENT OF THE INVENTION

To analyze large data steams for target anomalies, "sequential dependencies" (SDs) are chosen for ordered data and present a framework for discovering which subsets of the data obey a given sequential dependency. Given an interval G, a sequential dependency (SD) on attributes X and Y, written as X→GY, denotes that the distance between the Y-values of any two consecutive records, when sorted on X, are within G. SDs of the form X→$_{(0,\infty)}$ Y and X→$_{(-\infty,0]}$ Y specify that Y is strictly increasing and non-increasing, respectively, with X, and correspond to classical Order Dependencies (ODs). They are useful in data quality analysis (e.g., sequence numbers must be increasing over time) and data mining. SDs generalize ODs and can express other useful relationships between ordered attributes. An SD of the form sequence number→$_{[4,5]}$ time specifies that the time "gaps" between consecutive sequence numbers are between 4 and 5. In the context of data quality, SDs can measure the quality of service of a data feed that is expected to arrive with some frequency. In terms of data mining, the SD date→$_{[20,\infty)}$ price identifies data streams wherein the data points rapidly increase from day to day by at least 20.

In practice, even "clean" data may contain outliers. The degree of satisfaction of an SD by a given data set is evaluated via a confidence measure. Furthermore, real data sets, especially those with ordered attributes, are inherently heterogeneous, e.g., the frequency of a data feed varies with time of day, measure attributes fluctuate over time, etc. Thus, the SDs may be extended to Conditional Sequential Dependencies (CSDs), analogously to how Conditional Functional Dependencies extend traditional Functional Dependencies (FDs). A CSD consists of an underlying SD plus a representation of the subsets of the data that satisfy this SD. Similar to CFDs, the representation used here is a "tableau", where the tableau rows are intervals on the ordered attributes.

To make sequential dependencies applicable to real-world data, the SD requirements may be relaxed and allowed to hold approximately (with some exceptions) and conditionally (on various subsets of the data). Thus the invention contemplates the use of conditional approximate sequential dependencies for discovering pattern tableaux, i.e., compact representations of the subsets of the data that satisfy the underlying dependency.

BRIEF DESCRIPTION OF THE DRAWING

The invention may be better understood when considered in conjunction with the drawing in which.

DETAILED DESCRIPTION OF THE INVENTION

Interesting data sets often contain attributes with ordered domains: timestamps, sequence numbers, surrogate keys, measured values such as sales, temperature and stock prices, etc. Understanding the semantics of such data is an important practical problem, both for data quality assessment as well as knowledge discovery. However, integrity constraints such as functional and inclusion dependencies do not express any ordering properties. In this paper, we study sequential dependencies for ordered data and present a framework for discovering which subsets of the data obey a given sequential dependency.

Given an interval G, a sequential dependency (SD) on attributes X and Y, written as X→GY, denotes that the distance between the Y-values of any two consecutive records, when sorted on X, are within G. SDs of the form X→$_{(0,\infty)}$ Y and X→$_{(-\infty,0]}$ Y specify that Y is strictly increasing and non-increasing, respectively, with X, and correspond to classical Order Dependencies (ODs). They are useful in data quality analysis (e.g., sequence numbers must be increasing over time) and data mining (in a business database, delivery date increases with shipping date, in a sensor network, battery voltage increases with temperature, etc.) SDs generalize ODs and can express other interesting relationships between ordered attributes. An SD of the form sequence number→$_{[4,5]}$ time specifies that the time "gaps" between consecutive sequence numbers are between 4 and 5. In the context of data quality, SDs can measure the quality of service of a data feed that is expected to arrive with some frequency, e.g., a stock ticker that should generate updated stock prices every 4 to 5 minutes. In terms of data mining, the SD date→$_{[20,\infty)}$ price identifies stock prices that rapidly increase from day to day (by at least 20 points).

In practice, even "clean" data may contain outliers. We characterize the degree of satisfaction of an SD by a given data set via a confidence measure. Furthermore, real data sets, especially those with ordered attributes, are inherently heterogeneous, e.g., the frequency of a data feed varies with time of day, measure attributes fluctuate over time, etc. Therefore, Conditional Sequential Dependencies (CSDs) are proposed, which extend SDs analogously to how Conditional Functional Dependencies extend traditional FDs.

A CSD consists of an underlying SD plus a representation of the subsets of the data that satisfy this SD. Similar to CFDs, the representation used here is a tableau, but the tableau rows are intervals on the ordered attributes.

Figure 1:
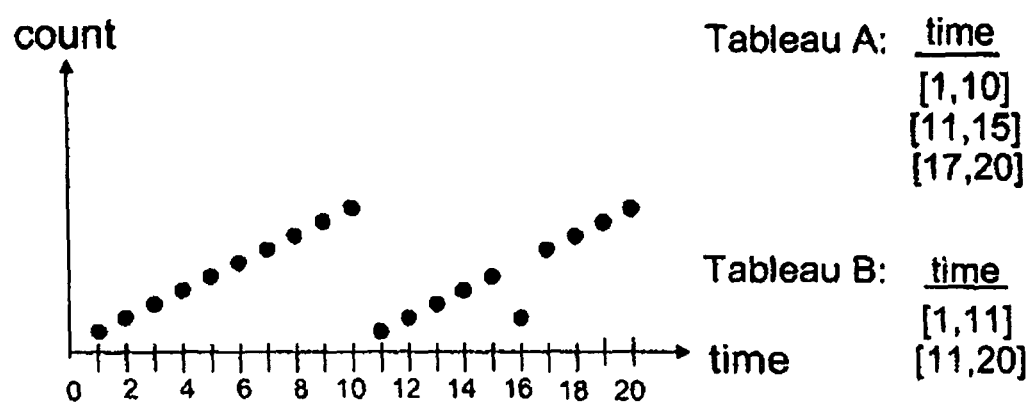
FIG. 1 is a tableaux for an SD time→$_{(0,\infty)}$ count.

Internet Service Providers (ISPs) collect various network performance statistics, such as the number of packets flowing on each link. These measurements are maintained by routers in the form of cumulative counters, which are probed periodically by a data collection system. A plot of packet counts versus time is shown in FIG. 1. While the counts are expected to increase over time, counters are finite (e.g., 32 bits) and thus periodically loop around. Furthermore, counters reset whenever the router is rebooted. Additionally, spurious measurements may appear (e.g., at time 16 in FIG. 1), such as when the data collector probes the wrong router. Due to the cyclic nature of the counters, the semantics of this data set cannot be captured by the SD time→$_{(0,\infty)}$ count; we need a conditional SD whose tableau identifies subsets that satisfy the embedded SD. For instance, each pattern in Tableau A from FIG. 1 corresponds to an interval that exactly satisfies the embedded SD. Alternatively, a small number of violations may be allowed in order to produce more informative tableaux and help avoid "overfitting" the data. Tableau B from FIG. 1 contains two patterns that capture the two mostly-increasing fragments of the data set (with one violation at time 16). It not only identifies the intervals over which the SD is obeyed but also pinpoints the time at which there is a disruption in the ordering (at time 11). Such tableaux are useful tools for concisely summarizing the data semantics and identifying possible problems with the network or the data collector, e.g., a tableau with many "short" patterns suggests premature counter roll-over.

Figure 2:
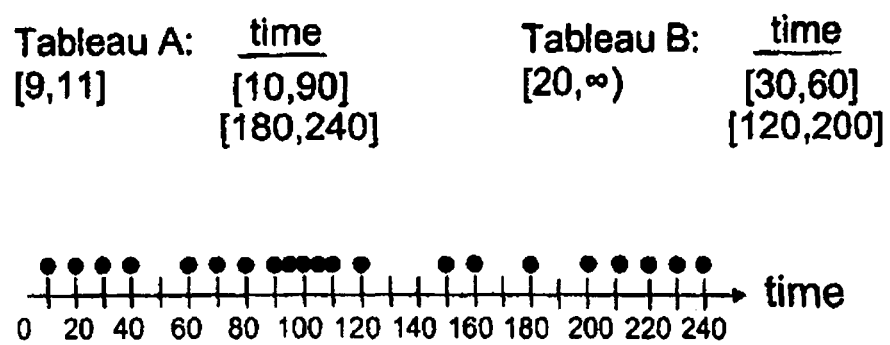
FIG. 2 is a tableaux for an SD pollnum→$_r$ time

An ISP may also be interested in auditing the polling frequency. The data collector may be configured to probe the counters every ten seconds; more frequent polls may indicate problems at the collector (it may be polling the same router multiple times) while missing data may be caused by a misconfigured collector or a router that is not responding to probes. A possible sequence of measurement times (not the actual counter values) is shown in FIG. 2, sorted in polled order, along with a tableau (labeled Tableau A) for the embedded SD pollnum$\rightarrow_{[9,11]}$ time, which asserts that the gaps between adjacent polls should be between 9 and 11 seconds. Again, each pattern is allowed a small number of violations to better capture the trends in the data; e.g., the first pattern [10, 90] contains one gap of length 20.

Furthermore, testing related SDs with different gap ranges reveals intervals that violate the expected semantics. For example, pollnum$\rightarrow_{[20,\infty)}$ time finds subsequences with (mostly) long gaps, as shown in Tableau B. Similarly, pollnum$\rightarrow_{[0,10)}$ time detects periods of excessively frequent measurements. The corresponding tableaux provide concise representations of subsets that deviate from the expected semantics, and are easier to analyze by a user than a raw (possibly very lengthy) list of all pairs of records with incorrect gaps. It is worth noting that simply counting the number of polls to detect problems is insufficient: if the window size for counts is too small (say, ten seconds), then false positives can occur if polls arrive slightly late; if the window size is too large (say, one hour), then false negatives can occur due to missing and extraneous data "canceling each other out".

A basic aspect of the invention is an integrity constraint for ordered data. The mechanisms generating ordered data often provide the order semantics—sequence numbers are increasing, measurements arrive every ten seconds, etc. However, finding subsets of the data obeying the expected semantics is laborious to do manually. We therefore assume that the embedded SD has been supplied and solve the problem of discovering a "good" pattern tableau. An objective is parsimonious tableaux that use the fewest possible patterns to identify a large fraction of the data ("support") that satisfy the embedded SD with few violations ("confidence"). The technical basis for this is a framework for CSD tableau discovery, which involves generating candidate intervals and constructing a tableau using a smallest subset of candidate intervals (each of which has sufficiently high confidence) that collectively "cover" the desired fraction of the data.

In this model, every tableau pattern must independently satisfy the embedded SD. The brute force algorithm computes the confidence of all $\Theta(N^2)$ possible intervals (in a sequence of N elements) and identifies as candidates those which have a sufficiently high confidence. Since the goal is to discover a concise tableau, large intervals that cover more data are preferred, and therefore candidate intervals that are contained in larger candidate intervals may be ignored. An initial observation is that CSDs obey a "prefix" property, whereby the confidences of all prefixes of a given interval I are incrementally computed en route to computing the confidence of I itself. Thus, it suffices to compute the confidence of the N intervals [i,N], where $1 \le i \le N$, and, for each i, find the maximum j such that the interval [i,j] has the required confidence.

A second observation is that CSDs also satisfy a "containment" property, which implies that the confidence of an interval slightly larger than some interval I must be similar to that of I. An approximation algorithm may be formulated that computes the confidence of a small set of carefully chosen intervals such that, for each candidate interval I identified by the exact algorithm, the algorithm is guaranteed to identify a slightly larger interval with a confidence not significantly lower than that of I. Instead of computing the confidence of the N intervals described above, the approximation algorithm only needs to compute the confidence of O (log N)/δ) intervals, where 1+δ is a bound on the approximation error.

In addition to improving the efficiency of the candidate generation phase, this framework improves the efficiency of the tableau construction step. This step solves the partial interval cover problem by choosing the fewest candidate intervals that cover the desired fraction of the data. An exact dynamic programming algorithm for this problem takes quadratic time in the number of candidate intervals. A linear-time and -space greedy heuristic is given to prove that it returns tableaux with sizes within a constant factor (of nine) of the optimal solution.

To summarize, among the main contributions are the following.
  Conditional Sequential Dependencies are proposed as novel integrity constraints for ordered data, and give efficient algorithms for testing their confidence.
  A general framework is given that makes the discovery of "good" tableaux for CSDs computationally feasible, provided that the confidence measure satisfies the prefix and containment properties.
  Experimental results are given demonstrating the efficiency (order-of-magnitude improvement over the brute force approach), as well as the utility (in revealing useful data semantics and data quality problems), of the proposed framework on a wide range of real data sets.

DEFINITIONS

Let S be a relational schema on attributes $A_1, A_2, \ldots, A_k$ with relation instance $R = \{t_1, t_2, \ldots, t_N\}$. Let dom(X)=$\{t_1[X], t_2[X], \ldots, t_N[X]\}$ refer to the set of domain values over X, where t [X] denotes the relation tuple t projected on the attributes X. The input to the problem is modeled as a relation, some of whose attributes have ordered domains.

DEFINITION 1 Let X and Y, X ⊂ S and Y ⊂ S, be two attribute sets, G be an interval, and $\bar{\pi}$ be the permutation of rows of R increasing on X (that is, $t_{\pi(1)}[X] < t_{\pi(2)}[X] < \ldots < t_{\pi(N)}[X]$).

A sequential dependency (SD) X→$_G$Y is said to hold over R if for all i such that $1 \le i \le N-1$, $t_{\pi(i+1)}[Y] - t_{\pi(i)}[Y] \in G$.

That is, when sorted on X, the gaps between any two consecutive Y-values must be within G.

X is referred to as the antecedent of the SD and Y as the consequent. Total orderings are assumed to exist on X and Y, and that there is a mapping f( ) which linearizes the different combinations of attribute values in X and Y into integers. For example, if X={hour,minute, second} then the tuple t[X]=(h, m, s) could be mapped via f(h,m, s)=3600 h+60 m+s.

In practice, an SD may not hold exactly: when ordered on X, the resulting sequence of Y-values may not have the correct gaps. Previous work on characterizing the extent to which ODs, FDs, and CFDs hold on a given relation instance employed a "deletion-based" metric that determines the largest possible subset of the relation that satisfies the constraint. Using this measure, the confidence of interval [11, 20] from FIG. 1 w.r.t. the SD time$\rightarrow_{(0,\infty)}$ count is 9/10 since the largest subset that makes the SD valid contains every record except the one at time 16. The confidence of the entire data set, i.e., the interval [1, 20], is 10/20 since the largest satisfying subset contains (the first) ten points.

Now consider the interval [10, 90] from FIG. 2. To satisfy the SD pollnum$\rightarrow_{[9,11]}$ time, select either the first four points or the last four points in this interval, for a confidence of 4/8. This confidence value seems low since this interval has only one "problem", namely a missing record around time 50. Thus the confidence of a CSD is defined using the following edit distance metric, which is a natural extension of the known deletion metric.

DEFINITION 2 The confidence of a suggested SD over a given relation instance (or subset thereof) of size N is (N−OPS)/N, where OPS is the smallest possible number of records that need to be inserted or deleted to make the SD hold.

Note that confidence cannot be negative since in the worst case, we can "delete" all but one record, which will trivially satisfy the SD. This metric has several useful properties. It is robust to occasional missing data—in the above example, the interval [10, 90] has a confidence of 7/8 since only one edit operation (insertion) needs to be made to satisfy the SD. It is also robust to spurious values. Returning to the above example, the sequence <10, 20, 30, 1000, 40> has a relatively high confidence of 4/5 since it suffices to delete the suspicious element 1000. Furthermore, the metric penalizes based on gap sizes, unlike just counting the fraction of "bad gaps" (i.e., those not in the specified gap range). For example, if all gaps are expected to be between 3 and 5, then a gap of 6 can be corrected by one insertion, but a gap of size 1000 requires 199 insert operations.

Having defined the confidence of a SD, computing it (i.e., computing OPS) on a relation instance is described.

Consider a "simple" SD of the form $X \rightarrow_{(0,\infty)} Y$, which requires Y to be increasing with X. Note that this SD does not limit the maximum gap length, so new records are not needed to reduce the lengths of oversized gaps. Its confidence may be computed from the length of the longest increasing subsequence on Y, after ordering the relation on X. More formally, let $\pi$ be the permutation of rows of R increasing on X. We wish to find a longest subsequence $\pi(i_1) < \pi(i_2) < \ldots < \pi(i_T)$ of $\pi$, $i_1 < i_2 < \ldots < i_T$, such that $t_{\pi(i1)}[Y] < \ldots < t_{\pi(iT)}[Y]$, for some T≤N. Let $S_N$ be the sequence $<t_{\pi(1)}[Y], \ldots, t_{\pi(N)}[Y]>$. The length (not the subsequence itself) of the longest increasing subsequence of $S_N$ is denoted by $LIS(S_N)$. Then the confidence of an SD on R is $LIS(S_N)/N$, which can be computed in O(N log N) time. In general, SDs of the form $X \rightarrow_{[G,\infty)} Y$, G a finite non-negative integer, can be handled in a similar way, by finding longest sequences increasing by at least G at every step. We note that other measures of "sortedness" may be natural for some applications (such as based on number of inversions, average inversion length or "satisfaction within bounds") and could be used in place of this quantity throughout this description, and can be computed within the same time complexity by the given framework.

SDs of the form $X \rightarrow_{[G1,G2]} Y$, are now considered, where $0 \leq_{G1} \leq_{G2} \neq 0$. A sequence (of Y-values mapped to integers, when sorted on X) is valid if it is non-empty, all elements are integers, and all its gaps are between $G_1$ and $G_2$. Computing the confidence requires finding OPS(N)—the minimum number of integers that must be added to or deleted from the length-N sequence in order to obtain a valid sequence. For example, the confidence of an SD with $G_1=4$ and $G_2=6$ on the sequence <5, 9, 12, 25, 31, 30, 34, 40> is 1−4/8=½. Deleting 12 and inserting 15 and 20 in its place (or deleting 5, 9 and 12) and then deleting 31 will convert the sequence into a valid one, and no series of three or fewer insertions and deletions will make the sequence valid. In general, the sequence need not be sorted, i.e., some gaps may be negative.

Given a sequence $<a_1, a_2, \ldots, aN>$ of integers, for i=1, 2, ..., N let $v=a_i$ and define T(i) to be the minimum number of insertions and deletions one must make to $<a_1, a_2, \ldots, a_i>$ in order to convert it into a valid sequence ending in the number v. (Note that since the value v might appear more than once in the sequence, one might get a sequence ending in a copy of v which is not the ith element in the sequence.) Now computing OPS(N) from the T(i)'s can be done as follows: $OPS(N) = \min_{0 \leq r \leq N-1} \{r + T(N-r)\}$, as proven in claim 3.

Claim 3 The minimum number OPS(i) of insertions and deletions required to convert an input sequence $S_i$ into a valid one is given by $\min_{0 \leq r \leq i-1}\{r+T(i-r)\}$. Furthermore, OPS(i) can be calculated inductively by OPS(1)=0 and OPS(i)=min{1+OPS(i−1), T(i)} for all i≥2.

PROOF. First, prove that $OPS(i) \geq \min_{0 \leq r \leq i-1}\{r+T(i-r)\}$. In the optimal transformation, let r be the exact number of terms at the end of the sequence $S_i = <a_1, a_2, \ldots, a_i>$ which are removed; hence, $a_{i-r}$ remains and appears in the final sequence. Clearly, $0 \leq r \leq i-1$. After removing those r terms, the optimal algorithm must transform the prefix consisting of the first i−r terms into a valid sequence ending in $a_{i-r}$. The cost to do this is T(i−r), and hence the optimal total cost is r+T(i−r). Since there is some r, $0 \leq r \leq i-1$, such that OPS(i)=r+T(i−r), it can be inferred that $OPS(i) \geq \min_{0 \leq r \leq i-1}\{r+T(i-r)\}$. Clearly $OPS(i) \leq \min_{0 \leq r \leq i-1}\{r+T(i-r)\}$ as well, since for each such r one could get a valid sequence by deleting the last r integers and then, at cost T(i−r), converting the sequence $<a_1, a_2, \ldots, a_{i-r}>$ into a valid sequence ending in the value $a_{i-r}$. The second statement follows from $OPS(i) = \min_{0 \leq r \leq i-1}\{r+T(i-r)\}$ by splitting off the r=0 case from the $1 \leq r \leq i-1$ case.

In order to show how to compute the T(i)'s, a definition of and a lemma about dcost is needed, a function which specifies the fewest integers that should be appended to a length-1 sequence to get a valid sequence whose last element is exactly d larger than its first.

DEFINITION 4 Define dcost(d), for d=0, 1, 2, ..., to be the minimum number of integers one must append to the length-1 sequence <0> to get a valid sequence ending in d, and ∞ if no such sequence exists.

It is nontrivial but not hard to prove the following lemma, whose proof is omitted here for simplicity.

LEMMA 5 If $G_1=0$, then $dcost(d)=\lceil d/G_2 \rceil$. Otherwise, $dcost(d)=\lceil d/G_2 \rceil$ if $\lceil (d+1)/G_1 \rceil > \lceil d/G_2 \rceil$ and ∞ otherwise.

For example, if $G_1=4$ and $G_2=6$, then dcost(7)=∞. Furthermore, dcost(8)=2, uniquely obtained with two gaps of length 4. This is interesting since one might be tempted to infer from "$dcost(d)=\lceil d/G_2 \rceil$" that all but one gap have length $G_2$.

LEMMA 6 Choose an i, $1 \leq i \leq N$. Let $v=a_i$. Then among all ways to convert $<a_1, a_2, a_i>$ into a valid sequence ending in the number v, there is one in which the ith symbol is never deleted.

Keep in mind that $v=a_i$ may appear more than once in the sequence $<a_1, a_2, \ldots, ai>$. If one generates a valid sequence ending in the value v, just which v is it? The v which is the ith symbol in the sequence? Or the v which is the jth, for some j<I with $a_j=a_i=v$? The content of this lemma is that there is always a minimum-cost way of transforming the sequence into a valid sequence in which v is the ith symbol, not the jth.

PROOF. If the ith symbol is deleted, let j be the largest index of a nondeleted symbol (which must exist). Clearly $a_j \leq a_i$, since in the final list all integers are at most $v=a_i$. If $a_j<a_i$, then the algorithm must at some point append an $a_i$, but then it was wasteful to delete the ith integer in the first place, and so it should not have. Hence it may be assumed that $a_j=a_i$. Now instead of deleting the ith symbol and not deleting the jth, delete the jth and do not delete the ith.

THEOREM 7 Having computed $T(1), T(2), \ldots, T(i-1)$, for some $i \leq N$, $T(i)$ may be computed using the existing $T(1), \ldots, T(i-1)$ as follows. Define $$\min_1 := i-1,$$

$$\min_2 := \min_{j:j<i, a_j<a_i}\{T(j)+(i-1-j)+[dcost(a_i-a_j)-1]\},$$

and define $$\min_3 := \min_{j:j<i, a_j<a_i}\{T(j)+(i-1-j)\{T(j)+(i-1-j)\}.$$

Then, $T(i)=\min\{\min_1, \min_2\}$ if $G_1>0$ and $T(i)=\min\{\min_1, \min_2, \min_3\}$ if $G_1=0$.

PROOF. Choose i, let $v=a_i$, and consider an optimal sequence of moves which converts $\langle a_1, a_2, \ldots, a_i \rangle$ into a valid sequence whose last entry is v. By Lemma 6, it may be assumed that the optimal sequence of moves does not delete the ith entry. Either the optimal sequence deletes the first i−1 integers or it does not. If it does, its cost is obviously i−1. If it does not, then let j be the maximum index less than i such that the jth symbol is not deleted. Clearly $a_{j+1}, a_{j+2}, \ldots, a_{i-1}$, a total of i−1−j integers, are deleted.

If $G_1>0$, then, since $a_i$ is not deleted, $a_j<a_i$. The adversary, who converts the input sequence into a valid sequence using the fewest operations, will then "bridge the gap" from $a_j$ to $a_i$, and convert $\langle a_1, \ldots, a_j \rangle$ into a valid sequence ending at $a_j$, at a cost of $T(j)$. Given a length-2 integral sequence $\langle y, z \rangle$, $y \leq z$, the number of integers one must insert between y and z to get a valid sequence (i.e., to "bridge the gap" from y to z) is 0 if y=z and $G_1=0$,
∞ if y=z and $G_1>0$, and
dcost(z−y)−1 if y<z.

Hence, the total cost is $(i-1-j)+(dcost(a_i-a_j)-1)+T(j)$.

If $G_1=0$, there is the additional possibility that $a_j=a_i$. The cost of bridging the gap is zero, for a total cost of $(i-1-j)+T(j)$.

Having a recurrence for computing the T(i)'s, allows one to use the recurrence to calculate all the T(i)'s quickly. If, for each $a_i$, every $a_j$-value with j<i is evaluated for the recurrence, then the algorithm will run in linear time for each i, or quadratic time in total. However, it is possible, for each i, to find the best j without trying all the linearly-many j's. The idea here is that the dcost values are either finite or infinite. Clearly any term having an infinite dcost can be ignored. The observation is that the infinite dcost come in a limited number of consecutive blocks, and hence the finite dcost also come in a limited number of consecutive blocks (all but one of which have finite size), which we call bands. It can be shown how to compute the minimum over one band, and therefore, for each i, the time to compute $a_i$ will be bounded by the product of the number of bands and the time per band. The overall time will be just N times this product.

Given some gap range $[G_1, G_2]$, the bands of finite values for dcost are the input value ranges $[k G_1, k G_2]$, for integers $k \geq 1$. Note that these bands widen with increasing k (if $G_1<G_2$). Indeed, when k becomes large enough, the bands will overlap and, therefore, no more dcost values of ∞ will occur for d this large. Exactly when will the overlap first occur? There is no space for a d with dcost(d)=∞ between the band $[l G_1, l G_2]$ and the next band $[(l+1) G_1, (l+1) G_2]$ is and only if $(l+1) G_1 \leq l G_2+1$, i.e., $l \geq [(G_1-1)/(G_2-G_1)]$ (if $G_1 \neq G_2$). The case where $G_1=G_2$ is treated separately below.

Given a fixed $a_i$, the formula for T(i) requires that we compute $dcost(a_i-a_j)$; hence, we wish to find the values of $a_j$ for which $dcost(a_i-a_j)$ is finite. Since dcost(d) is finite within bands $k G_1 \leq d \leq k G_2$ for each k, substituting $d=a_i-a_j$ and solving for $a_j$ yields bands $a_i-k G_2 \leq a_j \leq a_i-k G_1$. So the bands with respect to $a_j$ are now $[a_i-G_2, a_i-G_1], [a_i-2 G_2, a_i-2 G_1], \ldots, [a_i-(l-1) G_2, a_i-(l-1) G_1]$ and one band of infinite length $[-\infty, a_i-l G_1]$. Since the $a_j$'s come from sequence element values, clearly we never need to consider $a_j$-values less than the smallest value $a_{min}$ in the sequence. Thus, we can threshold any band extending below $a_{min}$, ensuring that no band is of infinite length (i.e., if $a_{min}$ lies within $[-\infty, a_i-l G_1]$ then this band gets truncated to $[a_{min}, a_i-l G_1]$) and possibly resulting in fewer than l bands to search. Note that, since in each of these bands dcost is finite, dcost(d) is equivalently defined as $[d/G_2]$. Furthermore, since $0 \leq [x]-x<1$ for all x, we can substitute the function $d/G_2$ in place of $[d/G_2]$ and obtain the same result, because all the other variables are integers so adding a fractional amount less than 1 will not change the rank order for the best $a_j$.

Here is how the algorithm proceeds. For a fixed i, in any band (with finite dcost) arg $\min_{j:j<i, a_j<a_i}\{T(j)+(i-1-j)+[dcost(a_i-a_j)-1]\}$ is equivalent to arg $\min_{j:j<i, a_j<a_i}\{T(j)-j-a_j/G_2\}$. So for each band k ($1 \leq k \leq l$), we find $j(k)=$arg $\min_j\{T(j)-j-a_j/G_2\}$ subject to $a_j \in [a_i-k G_2, a_i-k G_1]$, or subject to $a_j \in [amin, a_i-k G_1]$ if $a_i-k G_2<a_{min}$. Let j* be the minimum j from among these bands, that is, $j^*=\min_k\{j^{(k)}\}$. Then $\min_2=T(j^*)+(i-1-j^*)+[(a_i-a_{j^*})-1]$. We also need to consider the j's for which $a_j=a_i$. So we let $j^*=$arg $\min_{j:j<i, a_j=a_i}\{T(j)-j-a_j/G_2\}$ and $\min_3=T(j^*)+(i-1-j^*)$. Finally, we take $T(i)=\min\{\min_1, \min_2\}$ if $G_1>0$ and $T(i)=\min\{\min_1, \min_2, \min_3\}$ if $G_1=0$.

For the case of $G_1=G_2=G$, given some integer $G>0$, the algorithm is simpler and can be computed in $O(N \log N)$ time. The idea is to partition the sequence elements $a_j$ into G classes $0, 1, \ldots, G-1$ based on their (modG)-values. Then, given $a_i$, we search only the $a_j$'s whose $a_j \equiv a_i$ (modG), $a_j \leq a_i$, and take the j with smallest $T(j)-j-a_j/G$ as j*. Clearly, can be found in $O(\log N)$ time. As usual, we let $\min_2=T(j^*)+(i-1-j^*)+[dcost(a_i-a_{j^*})-1]$.

THEOREM 8 The confidence of an SD $X \rightarrow_{[G1, G2]} Y$ on a sequence of length N can be computed in time $O(G_2 N \log N/G_2-G_1)$ when $G_1 \neq G_2$ and in time $O(N \log N)$ when $G_1=G_2$.

PROOF. For each of N sequence elements, we search in at most $(G_2-1/G_2-G_1)+1=G_2/G_2-G_1$ bands for the arg min, and each band can be searched and updated in $O(\log N)$ time using a standard data structure for range-min over arbitrary ranges of values. In fact, we can afford to first sort the sequence element values, thus transforming them into their ranks, and store the min over each dyadic interval in rank-space. That way, the ranges can be transformed into being over a universe of size N (i.e., the ranks)—which makes updates much easier—and a range-min can be stored for every possible binary partition of the values with respect to their ranks. Then range query intervals can be decomposed into $O(\log N)$ adjacent dyadic intervals, from which the result can be obtained. The total query time is the product of these, $O(G_2 G_2-G_1 N \log N)$.

DEFINITION 9 A Conditional Sequential Dependency (CSD) is a pair $\phi=(X \rightarrow_G Y, Tr)$, where $X \rightarrow_G Y$, referred to as the embedded SD, and Tr is a "range pattern tableau" which defines over which rows of R the dependency applies. Each pattern tr □ Tr specifies a range of values of X that identify a subset of R (subsequence on X). The CSD states that, for each tr ☐ Tr, the embedded SD independently holds over the subset of the relation (subsequence on X) identified by tr.

Let [T_(i)[X], T_(j)[X]] be the interval represented by a tableau pattern tr; again, we let π be the permutation of rows in R sorted on X. We define the confidence of tr as the confidence of its interval w.r.t. the embedded SD, the support of tr as the number of records contained in its interval, i.e., j−i+1, and the position interval of tr as [i, j] (for example, the position interval of the pattern [30, 60] from Tableau B in FIG. 2 is [3, 5]). We also define the total support, or global support, of a CSD as the support of the union of the intervals identified by the tableau patterns (note that patterns may overlap).

The goal of tableau discovery is to find a parsimonious tableau whose patterns all provide sufficient confidence and describe a sufficient portion of the data. Thus, given a relation instance and an embedded SD, we wish to find a smallest tableau (if any exists) subject to confidence and (global) support threshold constraints.

DEFINITION 10 The CSD Tableau Discovery Problem is, given a relation instance R, an embedded SD X→GY, a global support threshold ŝ and a confidence threshold č, to find a tableau Tr of minimum size such that the CSD ϕ=(X→G Y, Tr) has a global support at least ŝ and that each tr ☐ T has confidence at least č.

Naturally, one could optionally impose a local support threshold that is met by each tableau pattern, in order to ensure that spurious and uninteresting patterns are not reported. Furthermore, rather than seeking a tableau with a sufficiently high global support, it may be useful to ask for the k "best" patterns (e.G., those having the highest local support) regardless of the global support.

A general tableau discovery framework may be posed. It is assumed that the confidence of an interval I containing N points may be written as f(I)/N, where f is some aggregate function, and that 0≤f(I)≤N to ensure that confidence is between zero and one. For the confidence metric, f(I)=N−OPS and 1≤f(I)≤N since more than N−1 edit operations are not needed. The framework consists of two phases: (1) generating candidate intervals and (2) choosing from these candidates a small subset providing suitable (global) support to be used for the tableau. What makes the first phase inherently challenging is that the confidence of an interval may not be readily composed from those of its subintervals due to the complex nature of whatever aggregate function is employed in measuring confidence. Take FIG. 1 for example. The confidence of the interval [1, 10] is 1, the confidence of [11, 20] is 0.9, but the confidence of [1, 20] is only 0.5. However, the following properties can be exploited.

DEFINITION 11 An aggregate function f over a sequence is said to satisfy the prefix property if the time to compute f on all prefixes of a sequence is no more than a constant greater than the time to compute it on the sequence itself. Hence the prefix property is a property of the algorithm computing f, rather than f itself. Formally, we are given some time bound G(N) and we need to assume that the property can be computed on all N prefixes of a sequence of length N in time G(N), in total.

DEFINITION 12 An aggregate function f is said to satisfy the containment property if for any sequence σ and subsequence τ appearing in consecutive positions of σ, f(τ)≤f(σ).

First, the given framework can be used to speed up interval generation with any confidence measure whose aggregate function f obeys both the prefix property and the containment property. Emphasis will be on developing scalable algorithms (i.e., running in time N poly log N). The framework uses the confidence measure from Definition 2.

Only intervals satisfying the supplied confidence threshold are considered as tableau candidates. Given a choice between any two candidates, where one is contained in the other, choosing the smaller one may unnecessarily increase the size of the tableau. Hence, for each i, max j≥i (if any) should be such that the position interval [i, j] has confidence at least č (in the remainder of this section, position intervals will be referred to as intervals unless otherwise noted). There are at most N such intervals as there is at most one with each given left endpoint. (One could go further and remove all intervals contained in others.)

A naive way to find candidate intervals would be to compute the confidence of all N(N+1)/2 possible intervals between 1 and N. Using the prefix property this can be improved by a factor of N by computing confidence over the intervals [1 . . . N], [2 . . . N], . . . , [N−1 . . . N] and using intermediate results. Unfortunately, this is still too expensive for large data sets if computing the confidence on an interval of length l requires (l) time, as it will require Ω (N$^2$) time to find all maximal intervals. How can we find these intervals without testing all (i, j) pairs? The trick, at the price of "cheating" on the confidence (as described below), is to test only a proper subset of the pairs, but enough so that, for any interval I chosen by an adversary (i.e., any interval which could appear in an optimal tableau), our set of candidate intervals contains one, J, which contains I and whose length is only slightly larger, specifically, |J|≤(1+e)|I|. Any aggregate function f satisfying the containment property will satisfy f(J)≥f (I), and hence its confidence f(J)/|J| will be at least f(I)/|J|≥f (I)/[(1+e)|I|]=(f(I)/|I|)/(1+e), and hence at least 1/(1+e) times as large as I's. Thus, by "cheating" on confidence (but only by the small factor 1/(1+e)), we can ensure that every adversary interval is (barely) covered by some candidate interval.

An approximation algorithm may be given for efficiently generating candidate intervals. The algorithm takes a real e>0 and builds a set of real intervals in [0,N], with the following property. For any subinterval I of [0,N] of length at least 1, among the intervals generated by the algorithm is an interval J which contains I and whose length is at most 1+e times as large.1

Now the intervals are generated. Choose a small positive δ with a value to be determined later. For each length of the form $l_h$=(1+δ)$^h$, for h=0, 1, 2, . . . , until (1+δ)$^n$ first equals or exceeds N, build a family of intervals each of length $l_h$, with left endpoints starting at 0, δ$l_h$, 2δ$l_h$, 3δ$l_h$, . . . , in total, about N/(δ$l_h$) intervals.

How much time will it take to compute the confidence of each such interval? Compute the sum of the lengths of the intervals, and multiply at the end by g(N)/N. For each of the log$_{1+δ}$ N values h, there are N/(δ$l_h$) intervals, each of length $l_h$. Hence their sum of lengths is N/δ. It follows that the sum of their lengths is the number of h's, i.e., log$_{1+δ}$ N, times N/δ. Since log$_{1+δ}$ N is approximately (lgN)/δ for small δ, the product is (N log N)/δ$^2$.

However, we can do better. To date we have used only the containment property; now we use the prefix property. We modify the intervals' design so that many will have the same left end-point. Break the intervals into groups according to their lengths: those with lengths in [1, 2), those with lengths in [2, 4), those with lengths in [4, 8), etc. There are obviously lgN groups. Within a group, our intervals have length $l_h$ for varying h's; their left endpoints are multiples of δ$l_h$. We now change their left endpoints as follows. For intervals with lengths in [A, 2A), now make the left endpoints multiples of δA≤δ$l_h$ (rather than δ$l_h$), shrinking the gap between consecutive left endpoints and enlarging the number of intervals by less than a factor of 2. However, note the following important fact: all the intervals with lengths in [A, 2A) start at 0, δA, 2δA, 3δA, . . . . By the prefix property, it suffices to include in the running time only the length of the longest interval with a given starting point. Hence we can process all the intervals with lengths in [A, 2A) in time G(N)/N multiplied by O (N/(δA) (2A), which is g(N)/N times O (N/δ). Since there are only lg N such groups (and not $\log_{1+\delta}$ N, as before), the total time to process all intervals will be g(N)/N times O((N lg N)/δ). Hence, for LIS computation, for example, for which g(N)/N is O(log N), the overall time will be O((N $\lg^2$ N)/δ). I CLAIM 13 Let I θ be the set of intervals in an optimal solution, each having confidence at least č, and θ be the set of intervals considered by our algorithm. For each I ∈I, there exists a J ∈θ with confidence≥(1−δ/1+δ) č containing I.

PROOF. How small a δ must be used such that for any interval I=[a, b] ⊂ [0,N] of length at least 1, one of our intervals contains Ī and has length at most 1+e times as large? Choose h smallest such that lh−δlh≥b−a, i.e., lh≥(b−a)/(1−δ). Then one of our intervals starts at a or no more than δlh to the left of a, and ends at or to the right of b. That interval contains I, clearly. By minimality of h, lh−1<(b−a)/(1−δ), and therefore the length $(1+\delta)^h$ of our interval is at most (1+δ)/(1−δ) times the length of I, proving claim 13. Claim 13 implies that it suffices to choose δ small enough that (1+δ)/(1−δ)≤1+e, i.e., δ≤e/(2+e). (For brevity, some implementation details on converting the real intervals into sets of contiguous integers have been omitted.)

Given a set of intervals in [0,N] satisfying the confidence threshold, each with integral endpoints and no two with the same left endpoint, we can assemble a tableau $T_r$ with support at least ŝ by selecting enough intervals to cover the desired number of points; in particular, we wish to choose the minimal number of intervals needed. Each selected (position) interval [i . . . j] then determines the tableau pattern [$t_{\pi(i)}$[X], $t_{\pi(j)}$[X]], i.e., the position interval mapped back to a range of X-values. We first show that, unlike the more general PARTIAL SET COVER problem, our problem is in P, by exploiting the fact that we have intervals rather than arbitrary sets. We give a O ($N^2$)-time dynamic programming algorithm to find a minimal (partial) cover. The algorithm takes as input a set θ of intervals of the form [i . . . j]={i, i+1, . . . j}, for some 1≤i,j≤N, and assumes they are sorted on their left endpoints. Via dynamic programming, the algorithm computes, for each 0≤k, l≤N, the value T(k, l) which equals the minimum number of the given intervals necessary to cover at least k points among {1, 2, . . . , l} (or ∞ if it is not possible to do so); the final answer is T[ŝN],N). T(0, 0)=0 and T(k, 0)=∞ for all k>0. After T(k, l') has been computed for all l'<l and all k=0, 1, 2, . . . , N, the algorithm computes T(k, l) for all k=0, 1, 2, . . . , N, using Lemma 14.

LEMMA 14 If there is no input interval containing l, then T(k, l)=T(k, l−1). Otherwise, among all intervals containing l, choose the one whose left endpoint is smallest; denote its left endpoint by l−z+1. Then $$T(k,l)=\min\{T(k,l-1),1+T(k-z,l-z)\}.$$

PROOF. As the first statement is obvious, we move on to the second. The optimal way to cover at least k of the points 1, 2, . . . , l either covers the point l or it does not. If it does not, its cost is T(k, l−1). If it does, it contains some interval which contains l. Without loss of generality it contains, among those intervals containing l, the one whose left endpoint is as small as possible. Suppose that that interval has left endpoint l−z+1 and therefore covers the z points l−z+1, l−z+2, . . . , l. Then T(k, l)=T(k−z, l−z)+1. Lemma 14 suggests an easy O ($N^2$)-time algorithm for computing all the T(k, l) values. Since the quadratic complexity of the dynamic programming algorithm makes it infeasible for large data sets, we consider an approximation to find a nearly minimal size using a greedy algorithm for PARTIAL SET COVER. We show that, for the special case in which the sets are intervals, the algorithm can be implemented in linear time and provides a constant performance ratio.

Claim 15 The greedy partial set cover algorithm can be implemented to run in time O(N).

Figure 3:
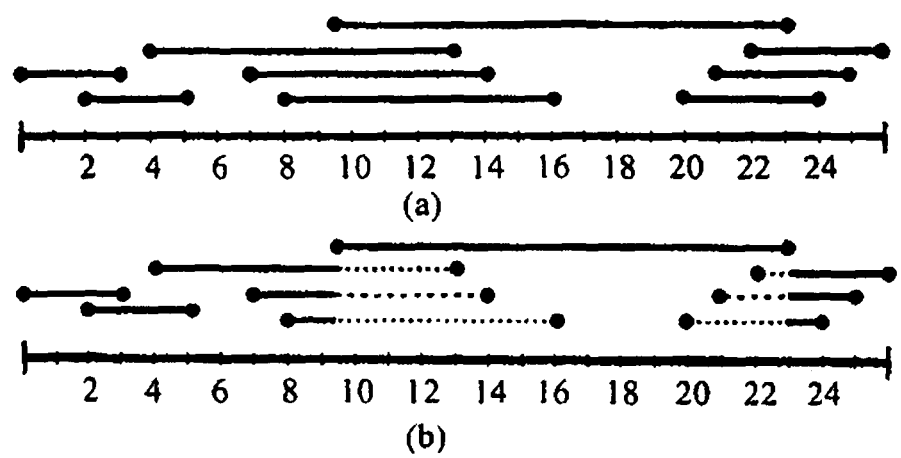
FIG. 3 illustrates adjusting marginal cardinalities.

PROOF. A set of intervals is given sorted on left (and also right) endpoints by the candidate generation phase. We separately maintain these intervals ordered by set cardinality in an array 1 . . . N of linked lists, where the array index corresponds to cardinality. At each step, we iterate down (initially from N) to the largest index containing a non-empty linked list, to find an interval with the largest "marginal" cardinality (which only counts points that have not already been covered by an interval that has already been added to the tableau), and adjust the marginal cardinalities of any overlapping intervals. Consider the intervals shown in FIG. 3(a) and suppose that the longest one has just been added to the tableau. As seen in FIG. 3(b), six intervals need to have their marginal cardinalities updated. Further, of these six intervals, which are now shorter, four are now contained in other ones and may be deleted. In general, each iteration of the algorithm deletes all but one interval intersecting the left endpoint of the currently longest interval; likewise for the right endpoint. Since there are at most N iterations and we adjust at most two intervals per iteration, the time spent adjusting the nondeleted intervals is N*O(1)=O(N). The total time spent deleting intervals, over the entire execution of the algorithm, is O(N), since there are at most N intervals.

Claim 16 The greedy algorithm gives a constant performance ratio.

An important property of our framework is that the size of a generated tableau can be no larger than the tableau generated when there is no cheating on confidence in the candidate interval phase, given the same confidence threshold. This is easy to see because cheating on confidence can only yield intervals subsuming optimal intervals, and with better choices available an optimal (partial) set cover will be at most as large.

To give examples of confidence metrics, first, we show that our tableau generation framework is compatible with our definition of confidence (Definition 2). In the special case of "simple" CSDs, we need to compute the length of a LIS in a given interval in order to compute its confidence. Many implementations of longest increasing subsequence incrementally maintain LIS on increasing prefixes in O(N log/V) time; hence, LIS satisfies the prefix property. As for the containment property, clearly if one interval is contained in another, then any subsequence of the smaller interval must be contained in the larger. Therefore, for simple CSDs, our framework is able to find candidates in O((N $\log^2$ N)/δ) time. While there is prior work on simultaneously computing LIS's of multiple (overlapping) windows of a sequence, none of this work breaks the quadratic complexity barrier. Recent work on computing the approximate size of a longest increasing subsequence on streams saves space but not time. Hence, we are not aware of a faster way to compute LIS that can help in our context. The dynamic program given above provides values at every prefix en route to computing the confidence of the entire interval, thus satisfying the prefix property. The containment property is also satisfied because the same valid gap sequence converted from an interval would also be available to any interval containing it; it would require no more deletions than the difference in the lengths to transform the larger interval into the same valid gap sequence. So for general CSDs, our framework is able to find candidates in $O(G_2/G_2-G_1)$ (N log$^2$ N)/δ) time. If one prefers to define confidence differently, such as based on the average number of inversions for SDs of the form $X \rightarrow_{[0,\infty)} Y$, or based on the fraction of gaps within $[G_1, G_2]$ for SDs of the form $X \rightarrow [G_1, G_2] Y$ with $G_2 < \infty$, then our framework also applies.

An experimental evaluation follows of the proposed tableau discovery framework for conditional sequential dependencies, which comprises candidate interval generation (CANDGEN) and tableau assembly (TABASSMB). First, to justify the motivation and utility of CSDs, we present sample tableaux which unveil interesting data semantics and potential data quality problems. Second, for both CANDGEN and TABASSMB, we investigate the trade-off between tableau quality and performance of resorting to approximation. Finally, we demonstrate the efficiency and scalability of the proposed tableau generation framework.

Experiments were performed on a 2.7 GHz dual-core Pentium PC with 4 GB of RAM. The performance numbers presented are based on real time as reported by the Unix time command. Experiments were run 5 times and the average time was reported. All algorithms were implemented in C++. We used the following four data sources for our experiments. Table 1 displays a summary of data characteristics.

- DOWJONES consists of daily closing figures of the Dow Jones Industrial Average2, and has the schema (DATE, AVGCLOSING). The closing figures have been smoothed using a 2-week moving window average.
- WEATHERDATES consists of the days on which daily temperatures were recorded at Gabreski Airport3 in Long Island, N.Y., from 1943.07.18-2008.10.01 by Global Summary of the Day.
- NETWORKFEEDS consists of data feeds of probed measurements from an ISP and the associated timestamps when they were received.
- TRAFFICPOLLS contains the timestamps of traffic volume measurements in an ISP that were configured to be taken every 5 minutes.

TABLE 1

Summary of Data Sources

| DATASET | #TUPLES | DEPENDENCY |
|---|---|---|
| DOWJONES | 27399 | DATE -> (0, 1) AVGCLOSING |
| NETWORKFEEDS | 916961 | STARTTIME -> (0, 1) ENDTIME |
| WEATHERDATES | 15716 | ARRIVALORDER -> [0, 1]DATE |
| TRAFFICPOLLS | 91522 | ARRIVALORDER -> [270, 330]TIME |

In the experiments that follow, we use the confidence threshold č=0.995, support threshold ŝ=0.5 (note that the tableau assembly algorithm may terminate before reaching the required support if it runs out of candidate patterns), and approximation tolerance parameter δ=0.05, unless mentioned otherwise.

We first show that CSDs with different gap values can capture interesting semantics. We also show that our approximate framework discovers tableaux that are close to optimal. Table 2 compares tableaux generated by exhaustive candidate generation (EXACTINTVL) and our approximate candidate generation (APPRXINTVL), for various gaps with greedy TABASSMB on the WEATHERDATES dataset. The support of each pattern is also shown, indicating the number of data values contained in the corresponding interval. Gap ranges of [0, 1] (at least one temperature reading per day) and [0, 2] (one reading every two days) result in tableaux with two rows, indicating that there was at least one major break in the data recording.

TABLE 2

Tableau sizes for various gap values on WEATHERDATES

| EXACTINTVL Tableau | Support | APPRXINTVL Tableau | Support |
|---|---|---|---|
| Gap: [0, 1] | | | |
| Tableau size: 2 | | Tableau size: 2 | |
| 1945.11.06-1969.12.15 | 6819 | 1944.02.07-1981.01.23 | 7536 |
| 1980.12.09-1990.12.10 | 3636 | 1981.02.05-2006.02.04 | 6999 |
| Gap: [0, 2] | | | |
| Tableau size: 2 | | Tableau size: 2 | |
| 1945.11.01-1969.12.15 | 6824 | 1944.02.07-1981.01.29 | 7542 |
| 1980.10.22-1991.01.23 | 3681 | 1981.02.05-2006.07.31 | 7176 |
| Gap: [0, 5] | | | |
| Tableau size: 2 | | Tableau size: 1 | |
| 1945.10.29-1969.12.15 | 6827 | 1943.07.18-2008.05.25 | 15588 |
| 1980.11.23-1995.05.10 | 5115 | | |
| Gap: [2, 10] | | | |
| Tableau size: 20 | | Tableau size: 20 | |
| 1995.06.23-1995.06.28 | 3 | 1995.06.23-1995.06.28 | 3 |
| 1983.02.21-1983.02.23 | 2 | 1983.02.21-1983.02.23 | 2 |
| 1985.09.27-1985.10.01 | 2 | 1985.09.27-1985.10.01 | 2 |
| 1988.04.05-1988.04.08 | 2 | 1988.04.05-1988.04.08 | 2 |
| Gap: [6, 10] | | | |
| Tableau size: 1 | | Tableau size: 1 | |
| 1991.01.01-1991.01.08 | 2 | 1991.01.01-1991.01.08 | 2 |
| Gap: [10, 20] | | | |
| Tableau size: 6 | | Tableau size: 6 | |
| 1951.06.01-1951.06.12 | 2 | 1951.06.01-1951.06.12 | 2 |
| 1980.11.23-1980.12.09 | 2 | 1980.11.23-1980.12.09 | 2 |
| 1990.12.20-1991.01.01 | 2 | 1990.12.20-1991.01.01 | 2 |
| 1991.01.11-1991.01.23 | 2 | 1991.01.11-1991.01.23 | 2 |
| 1991.02.18-1991.03.01 | 2 | 1991.02.18-1991.03.01 | 2 |
| 1994.07.15-1994.07.27 | 2 | 1994.07.15-1994.07.27 | 2 |
| Gap: [20, 1) | | | |
| Tableau size: 9 | | Tableau size: 9 | |
| 1945.11.29-1951.04.30 | 2 | 1945.11.29-1951.04.30 | 2 |
| 1969.12.15-1980.10.22 | 2 | 1969.12.15-1980.10.22 | 2 |
| 1991.10.02-1991.10.30 | 2 | 1991.10.02-1991.10.30 | 2 |
| 1993.10.19-1993.11.16 | 2 | 1993.10.19-1993.11.16 | 2 |
| 1994.02.03-1994.03.01 | 2 | 1994.02.03-1994.03.01 | 2 |
| 1995.05.10-1995.06.22 | 2 | 1995.05.10-1995.06.22 | 2 |

Note that the exact and approximate tableaux "latch onto" different endpoints. This was due to δ being set to 0.05, which meant that a confidence threshold of 0.995 was used for the exact tableau whereas effectively 0.995(1−0.05)/(1+0.05)= 0.9 was used for the approximate one. When we used δ=0.01 for the gap range [0, 2], the approximate tableau was the same as the exact one. Next, we identify time ranges over different scales over which no temperature data was recorded. A gap range [2, 10] was used to find periods when the recording was discontinued for about ten days at a time, possibly due to malfunctioning equipment. A comparison of the tableau row start and end dates, as well as their associated supports, reveal that the exact and approximate tableaux were quite similar, and both indicate periods when no data was recorded. A gap range of [6, 10] helps identify a time-frame from 1991.01.01 to 1991.01.08 which has 6 days of missing data. (since the support is 2, only the beginning point and the endpoint are present in the data). Similarly, [10, 20] returned 6 periods of moderate data loss—ten to 20 days at a time. In order to capture regions of long gaps, a gap range of [20,∞) was used. The first two patterns identify the two time periods of most significant loss: 1945 to 1951 and 1969 to 1980, when, according to the Wikipedia page for this airport, it was closed to the public.

Table 3 presents the sample tableaux for TRAFFICPOLLS.

TABLE 3

| Tableaux for TRAFFICPOLLS | |
|---|---|
| APPRXINTVL Tableau | Support |
| Gap: [270, 330] Tableau size: 2 | |
| 2008-10-09, 05:17:06-2009-03-06, 19:10:17 | 39925 |
| 2008-04-22, 23:15:38-2008-05-25, 21:33:20 | 8683 |
| Gap: [0, 150] Tableau size: 751 | |
| 2008-03-17, 21:07:02-2008-03-17, 21:08:56 | 2 |
| 2008-04-14, 16:00:23-2008-04-14, 16:00:23 | 2 |
| 2008-05-26, 05:05:31-2008-05-26, 05:05:31 | 2 |
| 2008-05-26, 06:17:43-2008-05-26, 06:17:47 | 2 |
| Gap: [350, 1) Tableau size: 4001 | |
| 2008-09-14, 13:18:38-2008-09-14, 14:59:24 | 14 |
| 2008-09-17, 07:33:51-2008-09-17, 09:06:06 | 11 |
| 2008-09-17, 01:22:46-2008-09-17, 02:11:02 | 7 |
| 2008-04-13, 03:48:21-2008-04-13, 05:32:38 | 6 |

The expected time gap between two successive polls is 5 minutes, or 300 seconds. Due to several factors from traffic delays to clock synchronization, this exact periodicity will hardly ever be met. Therefore, we allow for ±30 seconds and use a gap of 270 seconds to 330 seconds. The gap range [270, 330] is satisfied by much of the data and gives a tableau size of two. Next, a gap range of [0, 150] was used to identify regions of extraneous polls. There are several instances of very short time differences between polls, but these tend to occur only briefly (one poll). A gap range of [350,∞) was then used to identify regions with heavily delayed or missing data, which, when correlated with other information collected by the ISP, helped solve problems with the data collection mechanism. Table 4 presents sample tableaux for different gap ranges on the DOWJONES data set.

TABLE 4

| Tableaux for DOWJONES | | | |
|---|---|---|---|
| APPRXINTVL Tableau | Support | APPRXINTVL Tableau | Support |
| Gap: [0, ∞) Tableau size: 246 | | Gap: [0, 5] Tableau size: 286 | |
| 1949.06.07-1950.06.22 | 261 | 1949.06.07-1950.06.22 | 261 |
| 1904.05.17-1905.04.26 | 237 | 1904.05.17-1905.04.26 | 237 |
| 1921.08.15-1922.06.13 | 206 | 1921.08.15-1922.06.13 | 206 |
| 1953.09.18-1954.06.08 | 179 | 1953.09.18-1954.06.08 | 179 |

TABLE 4-continued

| Tableaux for DOWJONES | | | |
|---|---|---|---|
| APPRXINTVL Tableau | Support | APPRXINTVL Tableau | Support |
| 1942.07.28-1943.04.12 | 176 | 1942.07.28-1943.04.12 | 176 |
| 1925.03.24-1925.11.16 | 166 | 1925.03.24-1925.11.16 | 166 |
| 1915.05.19-1916.01.07 | 162 | 1915.05.19-1916.01.07 | 162 |
| 1898.09.30-1899.05.05 | 149 | 1898.09.30-1899.05.05 | 149 |
| 1958.04.11-1958.10.24 | 138 | 1935.03.14-1935.09.24 | 135 |
| 1935.03.14-1935.09.24 | 135 | 1945.07.26-1946.02.13 | 134 |
| Gap: [50, 100] Tableau size: 45 | | Gap: [100, ∞) Tableau size: 4 | |
| 2000.10.27-2000.11.08 | 9 | 2000.03.20-2000.03.28 | 7 |
| 1998.10.14-1998.10.23 | 8 | 2001.04.17-2001.04.18 | 2 |
| 1999.03.10-1999.03.18 | 7 | 2002.10.18-2002.10.21 | 2 |
| 2001.04.24-2001.05.01 | 6 | 2002.10.22-2002.10.23 | 2 |
| 2001.11.08-2001.11.19 | 6 | | |
| 2002.03.01-2002.03.08 | 6 | | |
| 2003.03.19-2003.03.26 | 6 | | |
| 1999.04.13-1999.04.16 | 4 | | |
| 1999.04.20-1999.04.23 | 4 | | |
| 1999.07.08-1999.07.13 | 4 | | |

Patterns for (0,∞) show time ranges over which Dow Jones stock market exhibited an increasing trend with very high confidence of 0.995. The first few patterns for gap [0, 5] are similar to those of (0,∞). This implies that successive increases in stock market prices, particularly over long periods of time, are usually by small amounts which mostly lie within the small range of [0, 5]. Gaps [50, 100] and [100,∞) capture regions where the stock market average closing price increased rapidly. The resulting tableau suggests that sharp increases in stock prices were mostly observed during the late nineties and early years of the 21st century, probably due to the "dotcom boom" and "housing bubble". Dow Jones data was chosen arbitrarily to demonstrate the invention. Any other investment data could be chosen.

Figure 4:
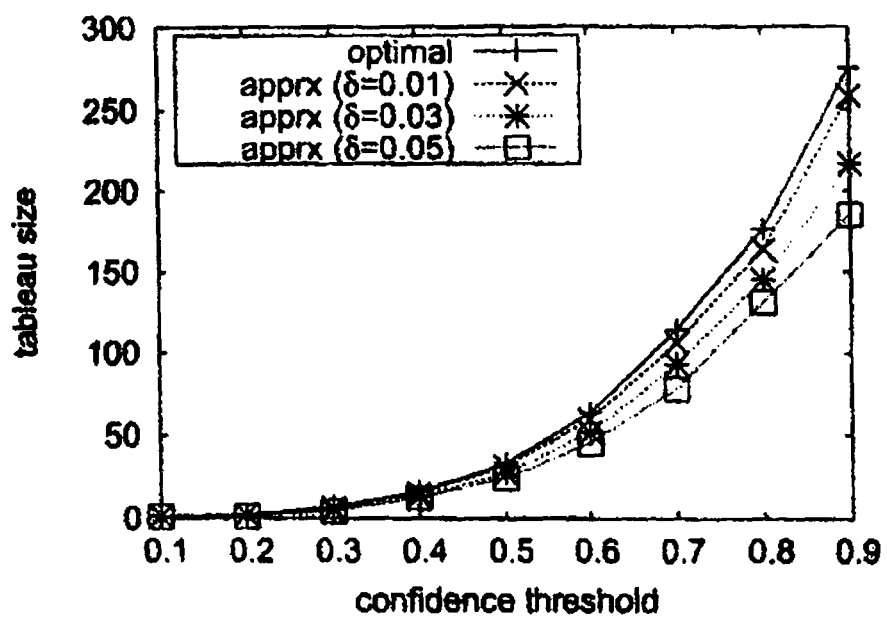
FIGS. 4-9 show various tableau sizes for data representing DOWJONES averages.
Figure 7:
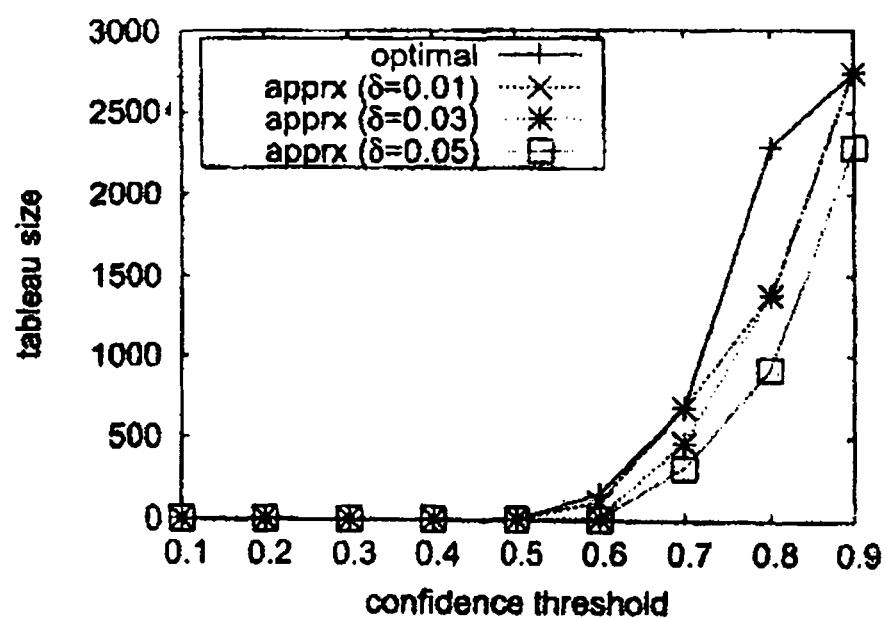

Good tableau quality can be demonstrated by comparing EXACTINTVL and APPRXINTVL tableaux over a wide variety of $\check{c}$, $\hat{s}$ and $\delta$ values. Since it is impractical to present actual tableaux for all the aforementioned cases, we use tableau size as a substitute for tableau quality and compare tableau sizes instead. FIG. 4 demonstrates the quality results of our approximate algorithms for DOWJONES data. For the gap range [0,∞), FIG. 4 compares the tableau sizes obtained from candidate intervals generated by EXACTINTVL and APPRXINTVL (using different $\delta$'s), as a function of confidence threshold $\check{c}$, using support $\hat{s}$=0.5. (Exact tableau assembly was used on the candidates from both methods.) The tableau sizes are quite similar for low values of $\check{c}$, and for high values of $\check{c}$ with low values of $\delta$. For example, at $\check{c}$=0.8 with $\delta$=0.01, there was only a difference in size of 12. For the gap range [0, 5], FIG. 7 shows a greater sensitivity to $\delta$, as there was a much more pronounced difference in tableau sizes at $\delta$=0.05, but again for $\delta$=0.01 the difference was relatively small.

Figure 5:
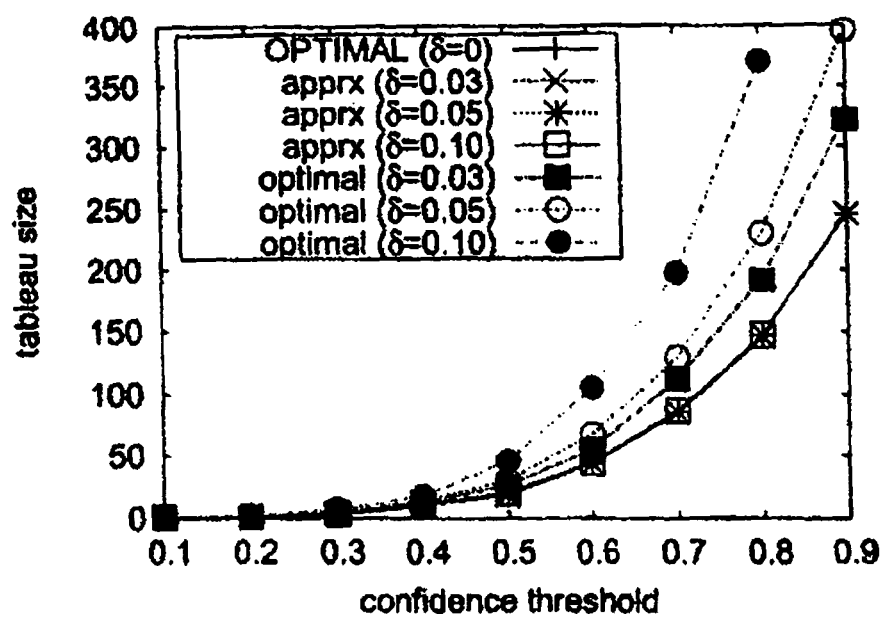
Figure 8:
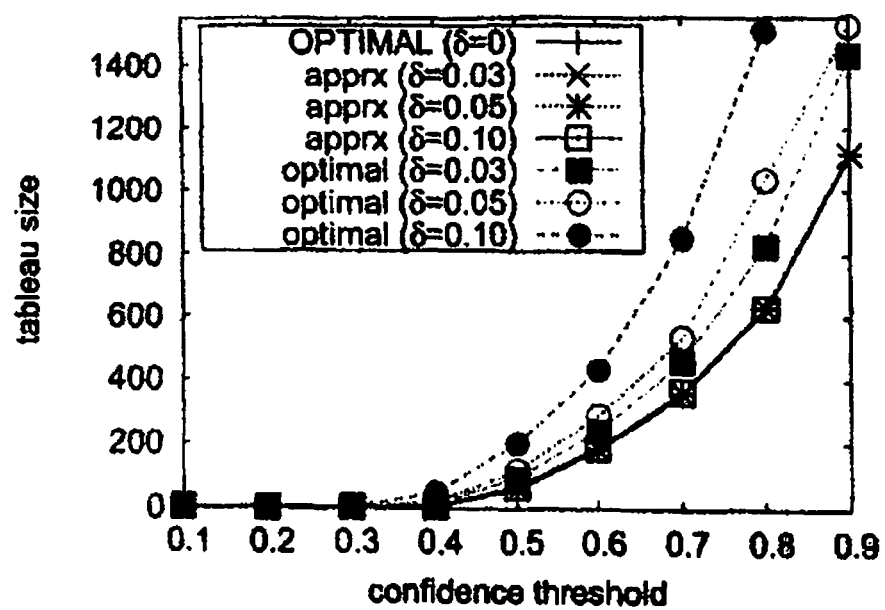

In the previous experiments, although a desired confidence threshold of $\check{c}$ was supplied, the algorithm relaxes this value to as low as $(1-\delta/1+\delta)\check{c}$ to guarantee that all optimal candidate intervals are covered by some interval reported by the approximation algorithm. Hence, the tableau size is never larger, and may be smaller, than that of an optimal solution. However, if one does not wish to allow such "cheating on confidence", then an alternative is as follows. Instead, we can "inflate" the desired confidence from $\check{c}$ to min $(1, (1-\delta/1+\delta))\check{c})$ so that the relaxed confidence is now no less than $\check{c}$ (but no greater than one), and thus not "cheat". Of course, this may now result in larger tableaux than the optimal. As usual, the effect of this will depend on δ: when δ is small, č will only be inflated by a small amount and thus the tableau sizes will be closer to optimal. The trade-off is that the algorithm takes longer with smaller values of δ but, as we shall show in the next subsection when we investigate performance, even with relatively small values of δ there is a significant improvement over running the exact algorithm. FIGS. 5 and 8 compare the results of OPTIMAL (EXACTINTVL with unmodified č),
apprx (APPRXINTVL with inflated č)
optimal (EXACTINTVL with inflated č) with various δ-values. Note that the tableau size of OPTIMAL lower-bounds that of apprx, which lower-bounds that of optimal.

FIG. 5 assumes gaps of [0,∞), whereas FIG. 8 uses gaps of [0, 5]. In all cases, the tableau sizes for APPRXINTVL (with inflated č) are lower-bounded by OPTIMAL (with unmodified č). This implies that, in order to obtain an "exact" tableau (using EXACTINTVL) for a given č, one might as well assume an inflated confidence of $(1-\delta/1+\delta)$ č (not exceeding 1) and obtain the same results using the much faster APPRX-INTVL CANDGEN. Similar behavior was observed for other ŝ values. For higher ŝ, the absolute value of the tableau sizes increase, as expected.

Figure 6:
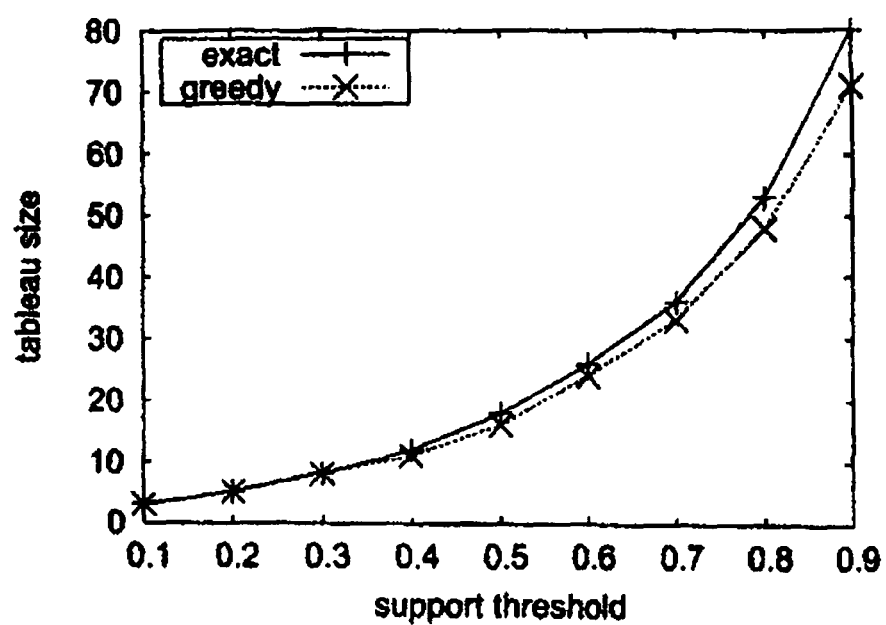
Figure 9:
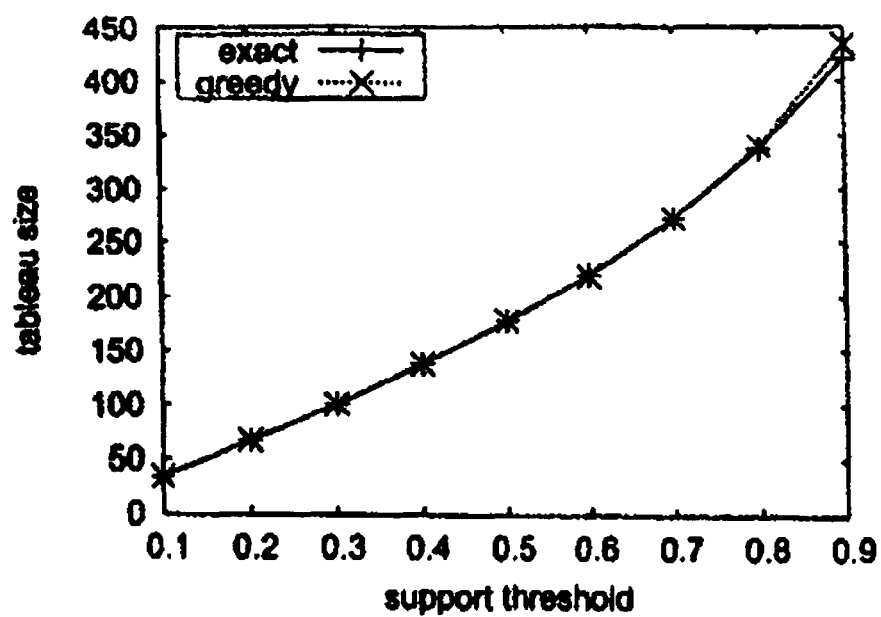

FIGS. 6 and 9 show that the greedy set cover algorithm (GREEDYASMBL) gives similar sized tableaux compared to the optimum that dynamic programming (EXACTASMBL) obtains—the curves are almost indistinguishable—at a variety of support thresholds with N=10000. FIG. 6 assumes gaps of [0,∞) and č=0.63, whereas FIG. 9 uses gaps of [0, 5] and č=0.7. Both the exact and approximate TABASSMB algorithms ran on the same set of input candidate intervals, which were generated by APPRXINTVL. Similar figures were obtained for other values of č and other data sets.

The foregoing highlights the fact that tableaux generated by APPRXINTVL are close to that of EXACTINTVL. We now show that APPRXINTVL can generate accurate tableaux while still being faster than EXACTINTVL by orders of magnitude. For the sake of efficiency on large inputs, all tableau generation methods here use GREEDYASMBL for assembly; results are reported as combined running time of CANDGEN and TABASSMB phases.

Figure 10:
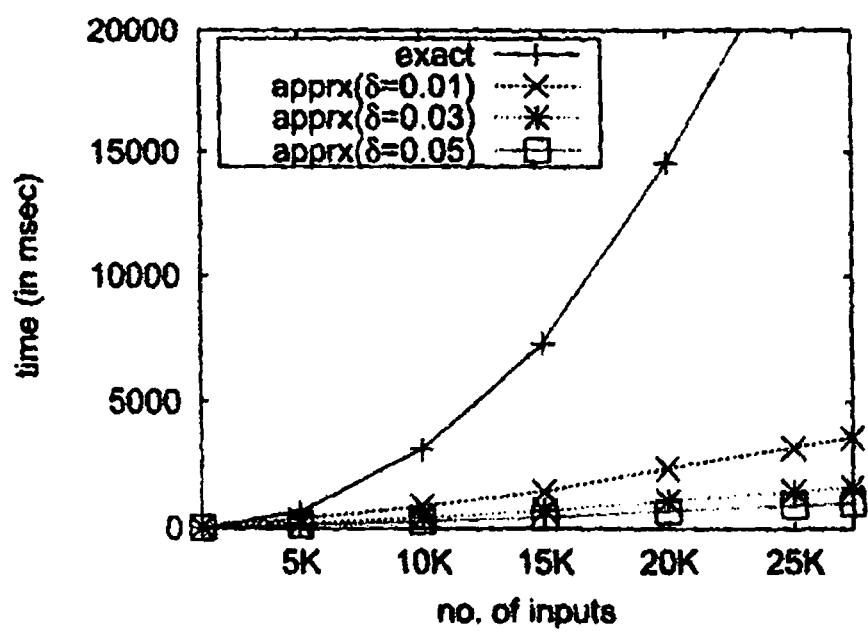
FIGS. 10-15 illustrate scalability for various data sets.
Figure 11:
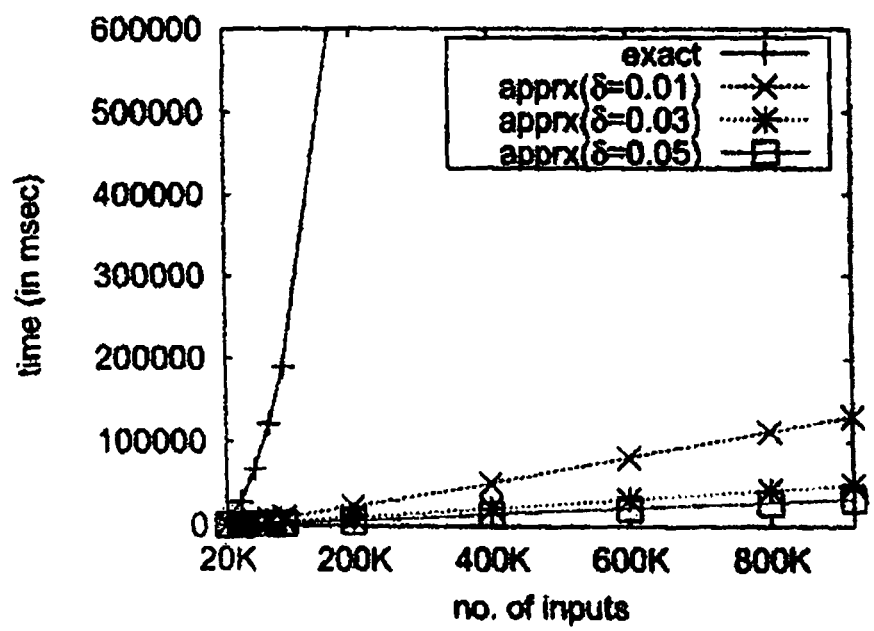
Figure 12:
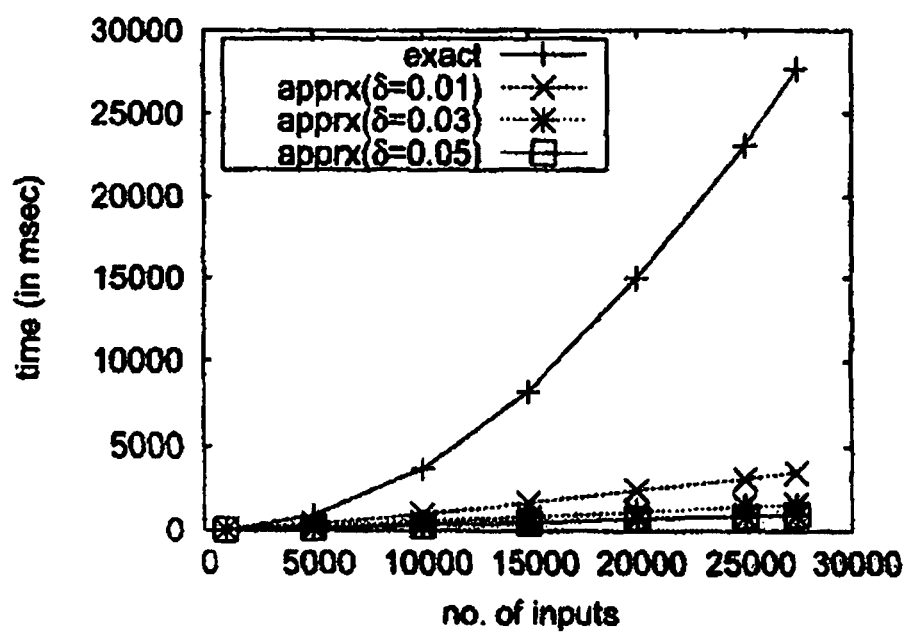
Figure 13:
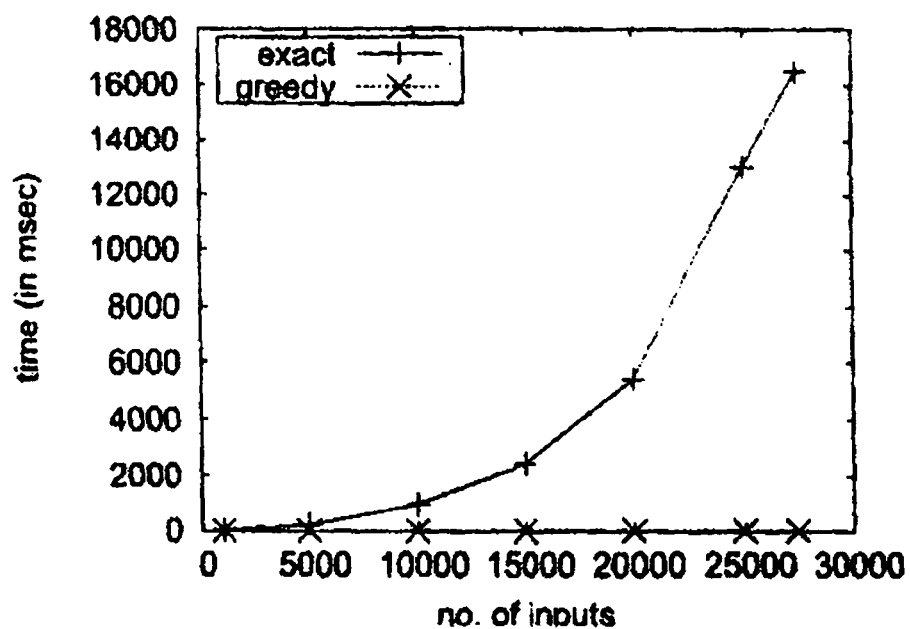
Figure 14:
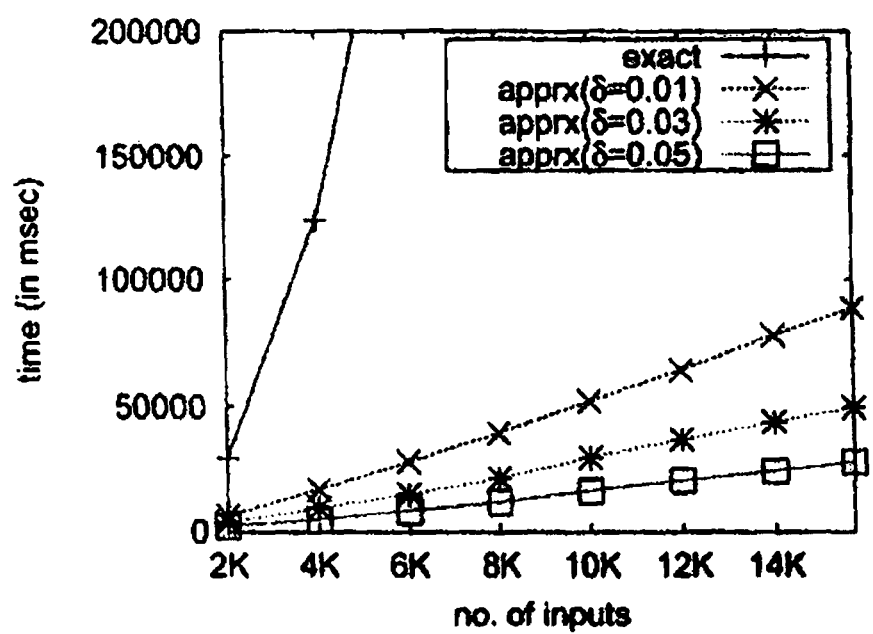
Figure 15:
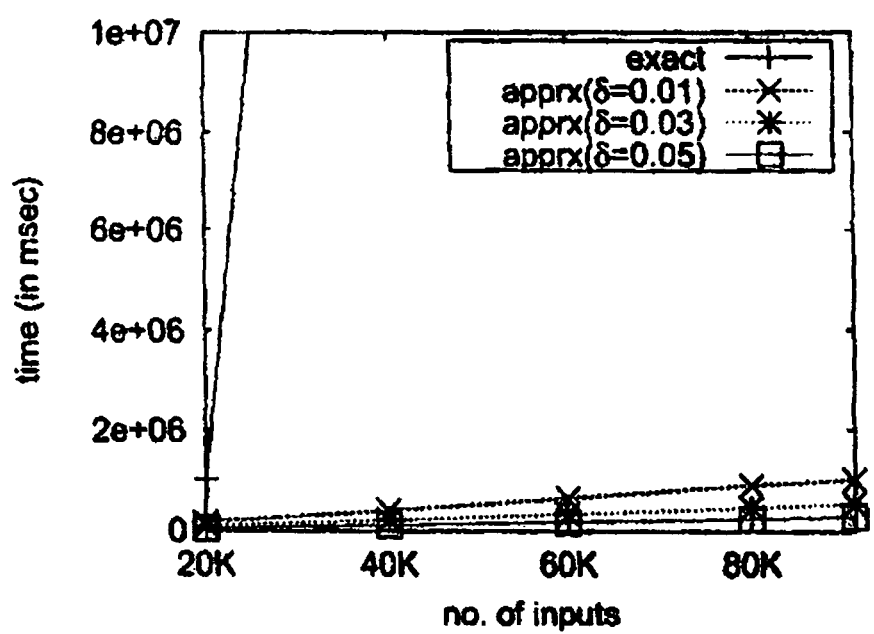

FIGS. 10-15 compare the performance of APPRXINTVL (using various δ-values) with EXACTINTVL for different data set sizes. For the gap range [0,∞), FIG. 10 and FIG. 11 present results using DOWJONES and NETWORKFEEDS data, respectively. APPRXINTVL scales more gracefully, especially in FIG. 11 where the exhaustive algorithm was halted because it ran too long. FIG. 14 and FIG. 15 show results using WEATHERDATES with gaps in [4, 6] and TRAFFICPOLLS with gaps in [270, 330], respectively. As before, the APPRXINTVL algorithm results in substantial improvement over EXACTINTVL, particularly for large number of inputs as can be seen in FIG. 15. While the performance is noticeably better with larger δ-values, in all cases the performance of APPRXINTVL is much faster (orders of magnitude) than that of EXACTINTVL, even with very low values of δ (e.g., 0.01). FIGS. 12 and 13 separate out the performance comparison of CANDGEN and TABASSMB phases, using DOWJONES data. FIG. 12 compares the running times of APPRXINTVL with EXACTINTVL and FIG. 13 compares GREEDYASMBL with EXACTASMBL. In FIG. 13, the curve for GREEDYASMBL is indistinguishable from the x-axis.

The examples given above involve numeric sequences. The underlying techniques may be applied to other forms of sequences, for example, alphabetic sequences, or alphanumeric sequences. Accordingly the expression alphabetic/numeric is used to include these alternative sequences.

In summary one embodiment of the technological data process described measures the fractional satisfiability of a given numeric sequence based on conformity with a predetermined constraint on the minimum and maximum difference between consecutive values in the sequence. Fundamentally, it involves inserting and/or deleting values into the sequence such that the new sequence will satisfy the predetermined constraints. The satisfiability factor of the data sequence is represented by the total number of such insertions and deletions in proportion to the sequence size. The resulting satisfiability factor may be used to evaluate the data stream in relation to other data sequences, or preset targets. If the satisfiability factor is below a given threshold remedial measures may be taken to improve the quality of the data sequence.

Another embodiment of the invention involves locating intervals of a sequence of numerical values with errors by testing different lengths at different starting positions to determine a satisfiability factor for each length, selectively choosing final intervals with a desired maximum satisfiability factor and summarizing these final intervals in a tableau. The intervals may be overlapping or non-overlapping.

As demonstrated by the examples given above, the data processes of the invention are implemented in electronic data processing devices and systems.

Various additional modifications of this invention will occur to those skilled in the art. All deviations from the specific teachings of this specification that basically rely on the principles and their equivalents through which the art has been advanced are properly considered within the scope of the invention as described and claimed.

The invention claimed is:
1. A method, comprising:
performing, via a processor, a first number of modifications to values in a first numeric sequence of a data set to generate a first modified sequence that conforms to a first numeric pattern, wherein the first numeric pattern comprises each difference between each successive pair of values being within a threshold;
determining, via the processor, a first fractional satisfiability metric for the first modified sequence based on a relationship between the first number of modifications and a size of the first numeric sequence;
performing a second number of modifications to values in a second numeric sequence of the data set to generate a second modified sequence that conforms to the first numeric pattern;
determining a second fractional satisfiability metric based on a relationship between the second number of modifications and a second size of the second numeric sequence;
comparing, via the processor, the first fractional satisfiability metric to the second fractional satisfiability metric; and
selecting one of the first or second numeric sequences based on the comparison.
2. The method of claim 1, wherein the first numeric sequence and the second numeric sequence are subsets of the data set.
3. The method of claim 1, further comprising summarizing the selection of the first or second numeric sequence in a table.

4. The method of claim 1, wherein the first satisfiability metric represents a ratio between the first number of modifications and the size of the first numeric sequence.

5. The method of claim 1, wherein selecting one of the first or second numeric sequences comprises determining which of the first and second satisfiability metrics corresponds to a lesser number of modifications in proportion to the respective size of the first and second numeric sequence.

6. The method of claim 1, wherein the first numeric sequence and the second numeric sequence represent investment data.

7. The method of claim 1, wherein the first numeric sequence and the second numeric sequence represent traffic data.

8. The method of claim 1, wherein the first numeric sequence and the second numeric sequence represent weather data.

9. A tangible machine readable storage device excluding propagating signals and comprising instructions which, when executed, cause the machine to perform operations comprising:
performing a first number of modifications to values in a first numeric sequence of a data set to generate a first modified sequence that conforms to a first numeric pattern, wherein the first numeric pattern comprises each difference between each successive pair of values being within a threshold;
determining a first fractional satisfiability metric for the first modified sequence based on a relationship between the first number of modifications and a size of the first numeric sequence;
performing a second number of modifications to values in a second numeric sequence of the data set to generate a second modified sequence that conforms to the first numeric pattern;
determining a second fractional satisfiability metric based on a relationship between the second number of modifications and a second size of the second numeric sequence;
comparing the first fractional satisfiability metric to the second fractional satisfiability metric; and
selecting one of the first or second numeric sequences based on the comparison.

10. A storage device as defined in claim 9, wherein the first numeric sequence and the second numeric sequence are subsets of the data set.

11. A storage device as defined in claim 9, wherein the operations further comprise summarizing the selection of the first or second numeric sequence in a table.

12. A storage device as defined in claim 9, wherein the first satisfiability metric represents the ratio between the first number of modifications and the size of the first numeric sequence.

13. A storage device as defined in claim 9, wherein selecting one of the first or second numeric sequences comprises determining which of the first and second satisfiability metrics corresponds to a lesser number of modifications in proportion to the respective size of the first and second numeric sequence.

14. An apparatus comprising:
a memory comprising machine readable instructions; and
a processor which, when executing the instructions, performs operations comprising:
performing a first number of modifications to values in a first numeric sequence of a data set to generate a first modified sequence that conforms to a first numeric pattern, wherein the first numeric pattern comprises each difference between each successive pair of values being within a threshold;
determining a first fractional satisfiability metric for the first modified sequence based on a relationship between the first number of modifications and a size of the first numeric sequence;
performing a second number of modifications to values in a second numeric sequence of the data set to generate a second modified sequence that conforms to the first numeric pattern;
determining a second fractional satisfiability metric based on a relationship between the second number of modifications and a second size of the second numeric sequence;
comparing the first fractional satisfiability metric to the second fractional satisfiability metric; and
selecting one of the first or second numeric sequences based on the comparison.

15. The apparatus of claim 14, wherein the first numeric sequence and the second numeric sequence are subsets of the data set.

16. The apparatus of claim 14, wherein the first satisfiability metric represents the ratio between the first number of modifications and the size of the first numeric sequence.

17. The apparatus of claim 14, wherein selecting one of the first or second numeric sequences further comprises determining which of the first and second satisfiability metrics corresponds to a lesser number of modifications in proportion to the respective size of the first and second numeric sequence.

* * * * *